United States Patent Office 3,186,468
Patented June 1, 1965

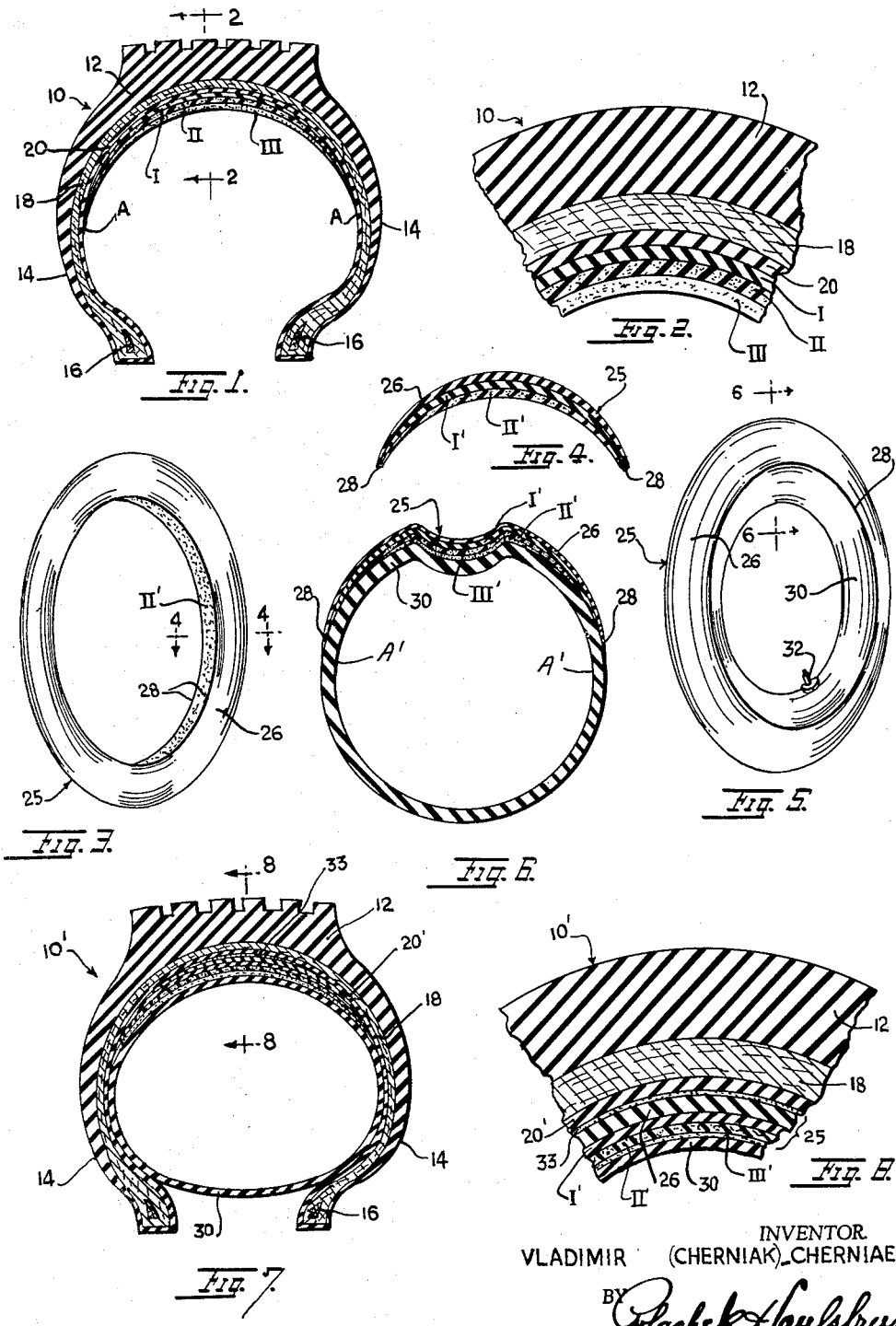

3,186,468
PUNCTURE SEALING MEANS
Vladimir (Cherniak)-Cherniaew, Brooklyn, N.Y., assignor of one-half to David Ratner, Brooklyn, N.Y.
Filed July 22, 1963, Ser. No. 296,798
5 Claims. (Cl. 152—347)

This invention concerns instant puncture-sealing layers and liners for tires and tubes.

The invention has as one object provision of novel formulations of flexible cements for forming an instant puncture-sealing lining on the inside of the tubeless tire or an instant puncture-sealing cover on the outside of a pneumatic tube employed in a tire casing.

Another object is to provide a novel method for applying cements to form flexible, instant puncture-sealing layers of a lining inside a tubeless tire.

Another object is to provide a novel method for applying cements to form a flexible, instant puncture-sealing cover for a pneumatic tube.

A further object is to provide a novel instant puncture-sealing lining for a tubeless tire.

Still another object is to provide a novel instant puncture-sealing cover for a pneumatic tube.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a cross-sectional view of a tubeless tire to which puncture-sealing layers are applied.

FIG. 2 is a sectional view on an enlarged scale taken on line 2—2 of FIG. 1.

FIG. 3 is a perspective view of a pneumatic tube cover made according to the invention.

FIG. 4 is a cross-sectional view on an enlarged scale taken on line 4—4 of FIG. 3.

FIG. 5 is a perspective view of an instant puncture-sealing cover mounted on a pneumatic tube.

FIG. 6 is a cross-sectional view on an enlarged scale taken on line 6—6 of FIG. 5.

FIG. 7 is a sectional view of a tire casing in which is a pneumatic tube and an attached instant puncture-sealing cover.

FIG. 8 is a fragmentary sectional view on an enlarged scale taken on line 8—8 of FIG. 7.

Referring first to FIGS. 1 and 2, there is shown a section of a tubeless tire 10 having a thick outer rubber tread 12 which is continuous with outer rubber side walls 14. The tire has beads 16 embedded at inner ends of a carcass 18 formed of multiple plies of fabric. The inside of the tire has a thin rubberized lining 20. To the extent described the tire is conventional. On the inner lining 20 is a flexible first puncture-sealing layer I securely adhering thereto. This layer is somewhat more flexible than the outer tread 12. Adhering to layer I is a soft, rather gummy layer II which is slightly tacky and which can be deformed by pressure. Adhering to layer II is an innermost layer III which is soft, gummy and sticky. It is capable of flowing into holes which may be formed in the tire by tacks and nails. When a puncturing nail is withdrawn from the tire, air pressure in the tire will force the layers II and III into the hole in layer I left by the withdrawn nail. As the nail is being withdrawn it may draw some of the gummy material of layers II and III into the hole which will effectively seal the hole against passage of air.

In FIGS. 3 and 4 is shown an instant puncture-sealing cover or jacket 25 for a pneumatic tube. This cover is in the form of an annular ring 26 which includes an outer flexible wall which is arcuate in cross section and feathered or tapered in thickness from its circumferential center to its outer edges 28. The inner concave side of wall or ring 26 is covered or coated with a flexible first sealing layer I' which is similar to layer I of tire 10. Layer I' is somewhat less flexible than the elastic body of the wall of ring 26. The inner side of layer I' is covered with a layer II' which is similar in consistency to layer II of tire 10. Layer II' is rather gummy and slightly tacky.

FIGS. 5 and 6 show the instant puncture-sealing cover or jacket of FIG. 3 secured circumferentially to the outer side of a pneumatic tube 30 by an appropriate cement layer III'. This cement layer is flexible and provides a good bond of the cover 25 to the outer side of the tube. The edges 28 of cover 25 are spaced from the inner side of the tube where air valve 32 is located.

FIGS. 7 and 8 show tube 30 and attached cover 25 installed inside of tire 10'. The assembly of tube and cover is free from the inner side of inner tire casing wall 20'. A layer or film 33 of talcum powder or other suitable powder on the inner side of wall 20' insures that the cover wall 26 remains free from the wall 20' of the tire casing so that the tube and attached cover can be removed from the tire casing when required. Parts of tire 10' which are similar to those of tire 10 are identically numbered.

It will be noted that in both the tire 10 and tube 30, the sealing layers cover only about one half of the surfaces to which they are applied. Thus in tire 10, layers I and II extend underneath the tread 12 and inwardly along the inner lining 20 to circular lines A just beyond the greatest width of the tire. In tube 30, the cover 25 extends across and around the outer periphery of the tube and inwardly to circular lines A' just beyond the greatest lateral width of the tube.

The several layers I–III and I', II' are made from liquid cement formulations as follows:

*Formulation No. 1*

XL-8 Shoe Cement _____ gallon__ ¼
Rubber Cement _____ do____ 1
Rubber Base Mastic Cement C.M.C. No. 22 __do____ ⅛
Negrosine _____ ounce__ 1

In the above formulation, the XL-8 Shoe Cement is a commercially available product manufactured by R-H products Company of South Acton, Massachusetts. The rubber cement is a commercially available product manufactured by Cat's Paw Rubber Co., Inc., of Baltimore, Maryland. The Rubber Base Mastic Cement is a commercially available product manufactured by Chicago Mastic Company of Chicago, Illinois. The Negrosine is a commercially available anelited product to keep the formula in soft condition and to keep the product black.

The above ingredients are all liquid of different degrees of viscosity. They are mixed together thoroughly until a homogeneous liquid mixture is obtained. The formulation is now ready for use.

*Formulation No. 2*

Rubber Base Mastic Cement C.M.C. No. 22 __gallon__ 1
Rubber cement _____ do____ 2
Negrosine _____ ounces__ 2

The ingredients of this formulation are the same as described above and are derived from the same sources. The liquids are mixed together until a homogeneous liquid mixture is obtained. The formulation is now ready for use.

Formulation No. 3

Rubber Base Mastic Cement C.M.C. No. 22

| | | |
|---|---|---|
| Rubber cement | gallon | ¼ |
| Pure white shellac | do | 1 |
| Negrosine | ounces | 5–9 |
| | do | 1 |

The ingredients of this formulation are the same as described above and are derived from the same sources. The shellac is a light, refined product of not more than S.A.E. 10 viscosity. The liquids of this formulation are mixed together until a homogeneous liquid mixture is obtained. The formulation is now ready for use. Some ethylene glycol base anti-freeze liquid may also be included by smearing on the surface to protect the rubber, and also the three layers from evaporation and to keep these layers in soft condition.

The Formulation No. 1 is used to make layers I and I' of the tire 10 and tube cover 25. Formulation No. 2 is used to make layers II and II' of the tire and tube cover. Formulation No. 3 is used to make layer III of tire 10. The layers are formed as described below, from the several formulations. Cement layer III' may be made from Formulation No. 2 or Formulation No. 3 depending on how tacky a bond is required between the cover 25 and tire 30. The cement layer III' will be less tacky and gummy with Formulation No. 2 than with Formulation No. 3.

Tubeless tire treatment

The portion of the inner surface of a tire to which the layers are to be applied is first thoroughly cleaned so that it is free of grease and dust. The tire surface is then roughened with a wire brush. The tire should then be held in a vertical plane and rotated at a speed of twenty to sixty revolutions a minute while a suitable quantity, about one-fourth of a gallon, of Formulation No. 1 is poured into the tire. The tire is rotated until the formulation has completely covered the interior area of tire lining 20 bounded by lines A to a thickness of about $\frac{1}{16}$ of an inch. Rotation is continued until the formulation hardens sufficiently so that it has completely passed from the liquid phase to a plastic phase. The layer is allowed to dry for about eight hours. The procedure is repeated twice until the total thickness of the layer is $\frac{1}{16}$ to $\frac{3}{16}$ of an inch. This forms layer I.

After the layer I has dried, one fourth of a gallon of Formulation No. 2 is applied to the vertical rotating tire and the tire is rotated until the liquid layer passes into a plastic state. Two more applications of Formulation No. 2 are made to the rotating tire until the total thickness of the second layer is about $\frac{1}{8}$ to $\frac{3}{16}$ of an inch. This forms layer II. The tire must now be set aside to permit the layers I, II to dry further for about two to three days and then rolled for creating a balanced condition.

Formulation No. 3 is then sprayed on the dried layer II inside the tire to form layer III. This layer is permitted to dry for about twenty-four hours. The pure white shellac keeps layer III in a soft, tacky condition. The processing is now complete and the tire may be installed on a wheel of a vehicle at any time thereafter.

Tube tire treatment

The inside of annular ring 26 is cleaned and roughened and Formulation No. 1 is applied to the roughened surface to a thickness of one sixteenth of an inch to about three sixteenth of an inch and when dry, the inner surface is made smooth to create a balanced condition.

Then the tube 30 is inflated and about seven inches of the outside surface of the tube is roughened during rotation. This rough surface will then be covered with a layer of about one thirty-second of an inch with Formula #1 and Formula #2.

The tube and a ring are rotated until about one-fourth of a gallon of the liquid formulation has been taken up. Then rotation is continued away from the container until the liquid phase has passed to a plastic phase. Two further successive applications of Formulation No. 1 are made and the tube with coated ring 26 on it is set aside for about eight hours for the coatings to dry. The coatings when dry form layer I'.

Layer II' is then applied by vertically immersing the tube still carrying the ring coated with layer I', in a container of Formulation No. 2 to cover layer I'. The tube is rotated until the coating II' becomes plastic. The tube is rotated until layer I' is covered. Two more applications of Formulation No. 2 are made to the rotating tube until the total thickness of the second layer is now about one sixteenth to three sixteenths of an inch. This forms layer II'. The tube and ring 26 covered by layers I' and II' are set aside to dry further for about two to three days. The ring 26 with set layers I', II' forms cover 25. Thereafter a smooth roller is applied to adhere the two layers and to keep the layers in balanced and uniform condition throughout. This cover is stripped from the holding tube and turned outside in. The cover is now ready for applying to any pneumatic tube 30.

The inner side of the tire 10' is cleaned and then dusted with a layer 33 of talcum powder or other separating medium. If desired, the inner side of the tire casing may be coated with a thin plastic layer such as a silicone or Teflon to which wall of ring 26 of the cover will not adhere. The deflated tube 30 with cover 25 thereon is then inserted inside the tire and the tube is inflated. This completes the installation of the assembly of tube and cover in the tire as shown in FIGS. 7 and 8. The tire is now protected against deflation by punctures, since layer II' will effectively seal any hole formed by a nail or tack as the puncturing member is removed.

It is to be understood that the tire casing is larger than the inside periphery of the tire and when the tube is placed there and inflated then the casing layers will be compressed and will prevent the formation of holes.

It is also to be understood that the method for assembling the tube type tires is as follows: First the dry, prepared tire is powdered inside then the ring is placed inside of the tire and powdered. Finally the tube is placed within the ring where it is inflated ready for use.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a tubeless tire having an interior wall, instant puncture-sealing means, comprising a first flexible layer adhering to said wall, a second layer adhering to the first layer, said second layer being soft, gummy and tacky, and a third layer adhering to the first layer, said third layer being softer than the second layer, more pliable and sticky, the second and third layers being capable of flowing into a hole formed in the tire to seal the hole against air passing therethrough, said first layer being formed of a mixture of shoe cement, rubber cement, rubber base mastic cement, and negrosine; said second layer being formed of a mixture of rubber base mastic cement, rubber cement, and negrosine; said third layer being formed of a mixture of rubber base mastic cement, rubber cement, pure white shellac and negrosine.

2. In an inflatable pneumatic tube for a tire, said tube having an outer wall surface, an instant puncture-sealing cover comprising an annular flexible soft rubber ring, a first flexible layer adhering to one side of said ring, and a second layer adhering to the first layer; said second layer being soft, gummy and tacky, both layers extending all around the circumference of said side of the ring; said second layer being secured to the outer wall surface of the tube; said first layer being formed of a mixture of shoe cement, rubber cement, rubber base mastic cement, and negrosine; said second layer being formed of a mixture of rubber base mastic cement, rubber cement and negrosine.

3. In a tubeless tire having an interior wall, instant self-sealing means comprising a first flexible layer adhering to said wall, a second layer adhering to the first layer, said second layer being soft, gummy and tacky, and a third layer adhering to the second layer, said third layer being softer than the second layer, more pliable and sticky, the second and third layers being capable of flowing into a hole formed in the tire to seal the hole against air passing therethrough, the first and second layers extending all around the circumference of said interior wall under the tread of the tire and extending laterally along opposing sides of said wall to circular lines lying just beyond the greatest lateral width of the tire, said first layer being formed on a mixture of shoe cement, rubber cement, rubber base mastic cement, and negrosine, said second layer being formed of a mixture of rubber base mastic cement, rubber cement, and negrosine, said third layer being formed of a mixture of rubber base mastic cement, rubber cement, pure white shellac and negrosine.

4. In an inflatable pneumatic tube for a tire, said tube having an outer wall surface, an instant puncture-sealing cover comprising an annular flexible ring, a first flexible layer adhering to one side of said ring, and a second layer adhering to the first layer; said second layer being soft, gummy and tacky, both layers extending all around the circumference of said side of the ring, and an adhesive third layer securing the second layer to the outer wall surface of the tube; said first layer being formed of a mixture of shoe cement, rubber cement, rubber base mastic cement, and negrosine; said second layer being formed of a mixture of rubber base mastic cement, rubber cement and negrosine.

5. A puncture-sealing cover for a pneumatic tube, comprising an annular flexible ring, a first flexible layer adhering to one side of said ring, and a second layer adhering to the first layer; said second layer being soft, gummy and tacky, both layers extending all around the circumference of said side of the ring; said first layer being formed of a mixture of shoe cement, rubber cement, rubber base mastic cement, and negrosine; said second layer being formed of a mixture of rubber base mastic cement, rubber cement and negrosine.

References Cited by the Examiner

UNITED STATES PATENTS

| | | | |
|---|---|---|---|
| 848,947 | 2/10 | Thorold | 152—347 |
| 2,055,797 | 9/36 | Loomis | 152—347 |
| 2,332,913 | 10/43 | Iknayan. | |
| 2,712,338 | 7/55 | Hurt | 152—347 |
| 2,712,847 | 7/55 | Harris | 156—115 |
| 2,771,936 | 11/56 | Iknayan et al. | 156—115 |
| 3,048,509 | 8/62 | Sweet et al. | 152—347 X |

ARTHUR L. LA POINT, *Primary Examiner.*